D. K. THOM.
Plow.
No. 18,475.
Patented Oct. 20, 1857.
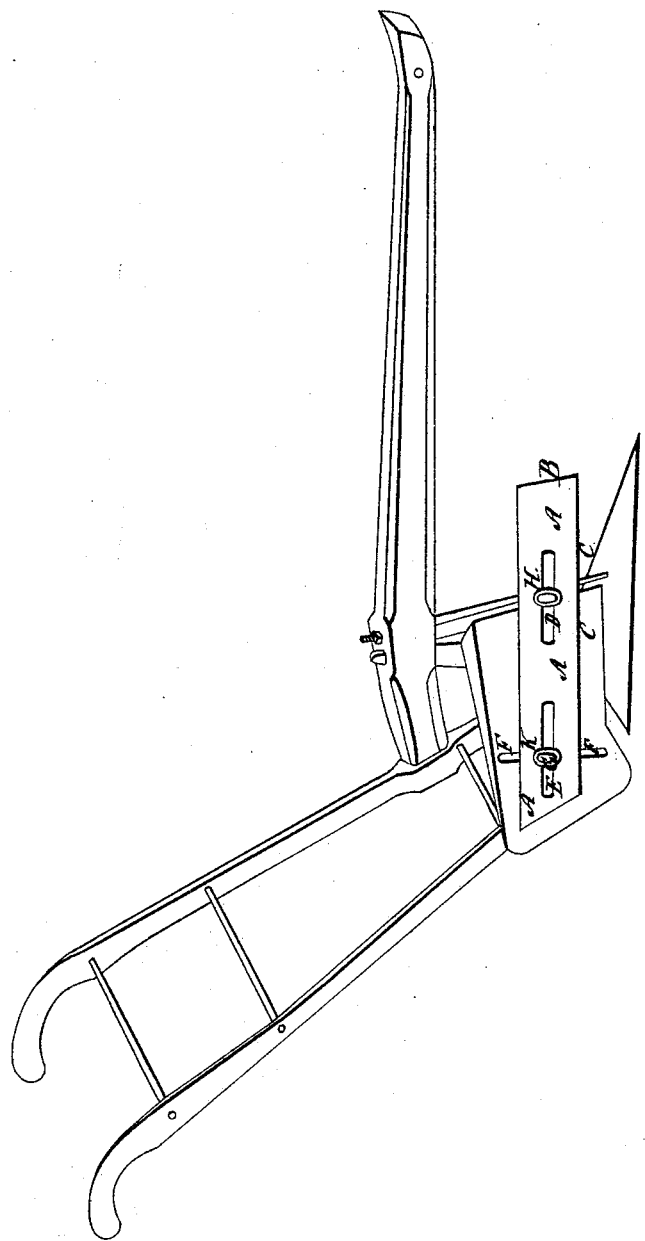

UNITED STATES PATENT OFFICE.

DAVID K. THOM, OF FARMINGTON, TENNESSEE.

IMPROVEMENT IN PLOWS.

Specification forming part of Letters Patent No. 18,475, dated October 20, 1857.

*To all whom it may concern:*

Be it known that I, D. K. THOM, of Farmington, county of Marshall, in the State of Tennessee, have invented a new and useful Improvement in Plows; and I do hereby declare that the following is a full and exact description thereof, reference being had to the accompanying drawings, and to the letters of reference marked thereon.

The nature of my invention consists in combining a scraper with the ordinary bar-share plow adjustable laterally and perpendicularly at pleasure, as hereinafter described.

To enable others skilled in the art to make and use my invention, I shall proceed to describe the same, its construction and operation, reference being had to the accompanying drawings, forming part of this specification.

In the drawings, Figure 1 represents a perspective view, and A the scraper, being a metal plate placed horizontally upon the mold-board, and is from six to eight inches wide and from twelve to eighteen inches long, with its left and front end, B, turning forward from one to one and a half inch, parallel with the beam of the plow or bar of the share, its lower and front edge, C, being turned nearly horizontal.

D and E are two parallel grooves running lengthwise on the scraper. Said scraper is attached to the plow by the square-stem and flat-head screw K, passing through the groove E and the oblong hole F in the mold-board, fastened behind with a nut or screw, G, and by the loop H, passing round the screw-rod and through the groove D and flattened on the outer end. Said scraper is adjustable at pleasure by slackening the screw or nut attached at G, behind the groove E.

What I claim as my invention, and desire to secure by Letters Patent, is—

Combining with the ordinary turning-plow an adjustable scraper, A A, adjustable laterally and perpendicularly, as hereinbefore described.

In testimony whereof I have hereunto set my hand and seal this 7th day of September, 1857.

DAVID K. THOM. [L. S.]

Witnesses:
 I. N. MCINTIRE,
 R. N. KENION.